June 19, 1962 G. R. COBB 3,040,138

STERILE TELEPHONE

Filed June 12, 1959

INVENTOR

GEORGE ROBERT COBB

BY Robert [signature]

ATTORNEY

3,040,138
STERILE TELEPHONE

George Robert Cobb, White Rock, British Columbia, Canada, assignor to Danco Telephone Co., Inc., Seattle, Wash., a corporation of Washington Filed June 12, 1959, Ser. No. 819,918
12 Claims. (Cl. 179—185)

The present invention relates to a sterile telephone which will be a self sterilizing telephone providing a sterilized mouthpiece and earpiece each time the user picks up the handset and removes it from its supporting cradle of the telephone.

One of the important objects of the invention is to provide a new telephone system which embodies a sterilization means for the mouthpiece and/or the earpiece of the handset.

It is not the purpose of the present invention to provide a sterilizing device as an attachment to a conventional telephone but to provide an entirely new telephone system which has a sterilization means for the mouthpiece and/or the earpiece incorporated in the telephone system.

The invention embodies a telephone system having sterilizer for the mouthpiece and/or the earpiece of the handset of the telephone wherein they may be automatically subjected to the sterilizing rays of an ultra-violet lamp upon being returned to the supporting base after use.

In the herein described arrangement a cup-shaped housing forming an enclosed chamber with the side wall of the casing is detachably mounted on such casing or cover enclosing the electrical components of a telephone circuit which are mounted on a base. A sterilizing lamp is mounted within the chamber and the ultra-violet rays are directed through an opening in the lamp housing which is directly beneath the mouthpiece and/or the earpiece of a handset when the latter is supported on the casing.

The cup-shaped sterilizing lamp housing is so constructed, that the wall having the opening through which the ultra-violet rays are directed is in closely spaced parallel relation to the surface of the mouth- and/or earpiece. To prevent the rays from escaping, an upstanding wall in concentric relation to the opening and encircling the periphery of the mouth- and/or earpiece is provided on the upper wall of the cup-shaped member.

When the handset is removed from the casing of the telephone, the lamp is deenergized but is automatically energized when the handset is replaced on the casing and will remain energized for a predetermined length of time sufficient to destroy bacteria and germs on the mouth- and/or earpiece, after which it will again become automatically deenergized.

The cup-shaped housing for the lamp is so constructed that it may be easily detached from the side of the casing by an unskilled person in order to remove and replace the sterilizing lamp when necessary or desirable.

Another object of the invention is the provision of a telephone instrument having a sterilizing lamp arrangement and which is directly mounted on the outside casing of the instrument but the rays from which are prevented from escaping into the atmosphere when in normal operation.

A still further object of the invention is to provide a telephone with a sterilizing lamp, the rays from which are confined and directed solely to the part of the telephone to be sterilized.

Still another object of the invention is the provision of a telephone with a sterilizing lamp arrangement which is mounted on the outer casing of the instrument and which is readily accessible for replacement.

Figure 1:
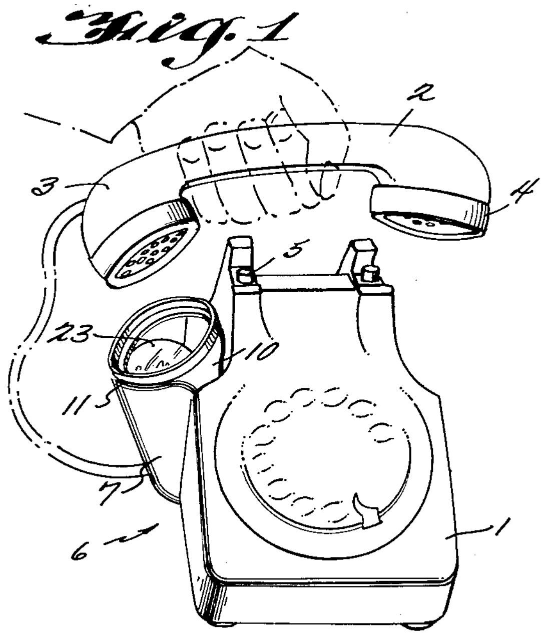
FIG. 1 is a perspective view showing a telephone with the sterilizing device mounted on the casing of the telephone and with the handset removed.
Figure 2:
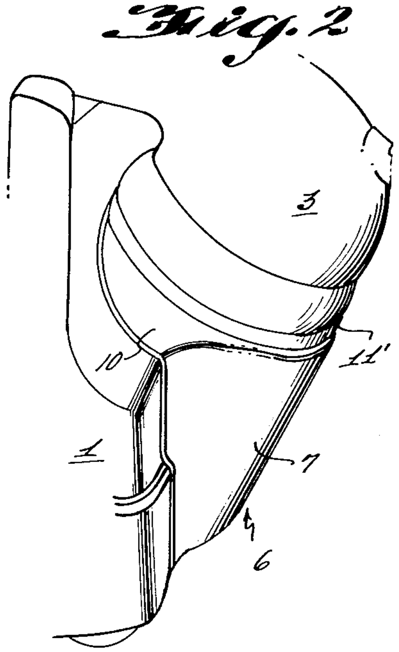
FIG. 2 is a rear view of the telephone with the handset resting on the base and the mouthpiece covering the opening in the lamp housing.

The invention is shown in connection with a telephone having a base on which the electrical components are mounted and which is enclosed by a casing or housing 1 the upper part of which forms a cradle or support for the handset 2 of the telephone and which carries the mouthpiece 3 and earpiece 4 at opposite ends thereof. As is conventional, the mouth- and earpieces are formed at an angle to the handset and overhang the sides of the casing 1 when not in use. The vertically movable buttons 5 mounted on the cradle operate a switch within the casing to deenergize the telephone when the handset is mounted on the cradle.

Figure 3:
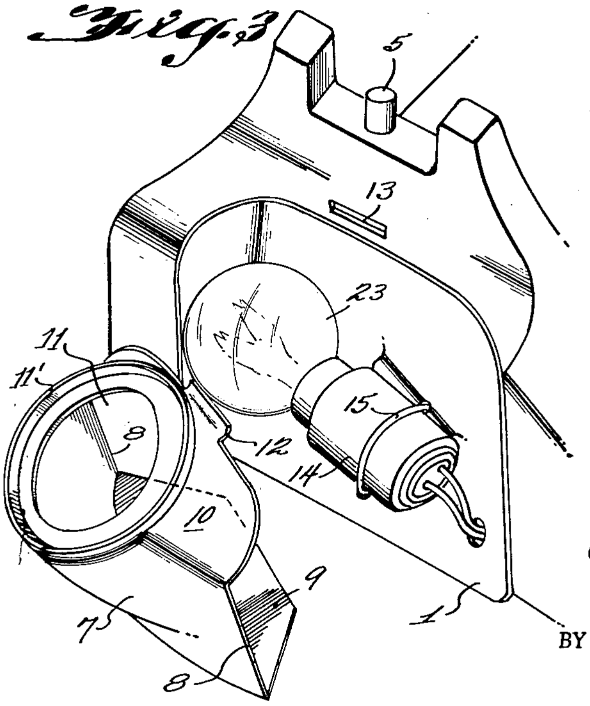
FIG. 3 shows details of the cup-shaped housing for the sterilizing lamp.
Figure 4:
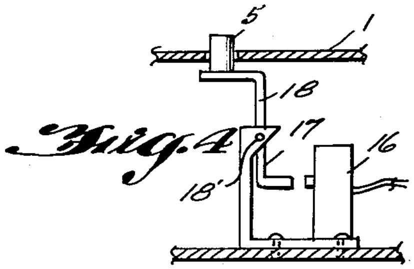
FIG. 4 shows the mounting for the switch by which the sterilizing lamp is energized.

To either or boths sides of the casing is detachably connected a cup-shaped housing 6. The housing 6 is generally formed of thin, substantially rigid plastic material. As shown in FIG. 3, the cup-shaped housing is in the form of a substantially arcuate wall 7 having substantially vertically extending side edges 8 for engaging the side of the casing 1. An inwardly extending wall 9 is secured to the bottom edge of the arcuate wall 7 and extends radially inward beyond a line joining the side walls, the inwardly extending wall thus underlying the base of the telephone. Another wall 10 extends from the top of the arcuate wall member 7 at an angle slightly greater than 90 degrees as shown, but this angle depends on the angle of the plane, in which the active surface of the mouth- or earpiece lies, with respect to the sides of the casing when the handset is cradled thereon.

When the cup-shaped member 6 is assembled to the side wall of the casing 1 with the bottom wall 9 underlying and against the bottom surface of the casing with the side edges against the side wall of the casing, the top wall 10 is in a plane, almost if not, in contacting relation with the lower surface of the mouthpiece or earpiece of the handset. A circular opening 11 of somewhat less diameter than the mouthpiece or earpiece and concentric therewith, is formed in the top wall to expose the mouth- or earpiece with which it is associated to the chamber formed by the cup-shaped member with the side wall of the casing.

The cup-shaped member 6 may be detachably connected to the side wall of the casing 1 by providing a hook-shaped extension 12 of the top wall and which may be formed integrally therewith. A slot 13 provided in the side wall of the casing receives the hook-shaped extension. Any other form of detachable mounting may be provided in order to provide easy attachment or removal of the cup-shaped member. The cup-shaped member together with the bottom wall and top wall having the opening therein may be integrally formed in one moulding or shaping operation. Also integrally formed on the top wall of the member is an upwardly projecting wall 11' concentric with the opening and of a diameter to encircle the periphery of the mouth- or earpiece when the latter is positioned over the opening in the top wall.

A socket for the sterilizing lamp within the chamber formed by the cup-shaped member and side wall of the casing may be mounted either on the casing side wall by means of a strap member 15 or may be suitably attached to the inner wall of the cup-shaped member. A pair of leads for energizing the lamp and attached to the socket extend through an opening in the adjacent side wall of the casing.

Mounted on the base and within the casing 1 is a micro-switch 16 which may be engaged by an extension 17 of a hook-shaped bar 18 pivoted about axis 18', the horizontal portion of which underlies the vertically movable buttons 5 on the cradle of the casing. The hook-shaped bar is also utilized for energizing the conventional switches for energizing the telephone transmitter and receiving circuits.

Figure 5:
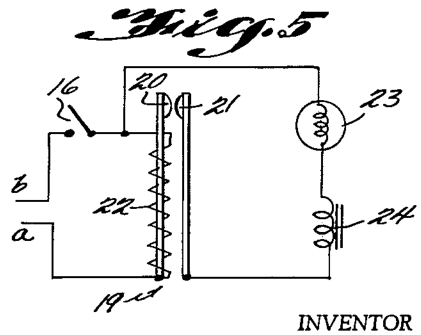
FIG. 5 is the circuit utilized for automatically controlling deenergization of the sterilizing lamp.

Also mounted on the base is a conventional thermal relay 19 diagrammatically illustrated in the circuit of FIG. 5. Such a thermal relay is well known in the art and need not be fully described herein. It consists of a pair of contacts 20, 21 herein shown as being normally closed when the switch 16 is open. One of said contacts is formed on a bi-metallic element which is adjacent a heater winding 22 connected between one terminal *a* of the switch 16 and a lead connected to a source of voltage. The sterilizing lamp 23 is connected between the one terminal of the switch 16 and the other lead *b* of the voltage source through the series connected choke 24 and contacts 21, 22.

When the handset is removed from its support or cradle, the switch is opened, thus deenergizing the heater winding 22 which cools rapidly and allows the contacts 20, 21 to close. The lamp 23 will remain deenergized since the circuit is disconnected from the voltage source. After using the handset for transmitting and listening and replacing it on the support in a normal position, the buttons close switch 6 due to the weight of the handset and the circuit to the lamp and heater winding is closed, causing energization thereof. The ultra-violet light of the lamp is thus directed against the mouth- and/or earpiece associated therewith.

When the heater winding reaches a predetermined temperature, the bi-metallic strip carrying one of the contacts 20, 21 moves to break the circuit to the lamp. The thermal relay may be designed to open the contacts after any interval of time after energization thereof, but it has been found that about one minute is sufficient length of time to maintain the sterilizing lamp energized for destroying bacteria and germs adhering to the mouth- or earpiece of the handset.

It will thus be seen from the foregoing description that I have provided a new and novel telephone system embodying a sterilizing means for the mouthpiece and/or earpiece of the telephone that will at all times be positive and efficient as well as entirely automatic in its operation.

Furthermore, by arranging the parts as shown, the sterilizing lamp may be replaced by an unskilled person without the use of tools.

Also, simple and inexpensive components of a circuit are utilized in an automatically deenergizing the lamp after being activated a sufficient length of time to destroy harmful germs and bacteria and without danger to humans in the vicinity of the telephone.

Having fully described my invention, what I claim is:

1. A telephone instrument having a housing for the electrical components thereof and for supporting the handset of the instrument, a mouthpiece and an earpiece carried by the handset, said housing having a laterally extending side wall portion directly beneath at least one of the said pieces, the top wall of the extending side wall portion being in substantially close parallel relation to the said one of the said pieces when supported on the base, a hollow chamber formed in said laterally extending wall portion and having an opening through the top wall in registration with said one of the said pieces and being entirely covered thereby, and a sterilizing lamp within the chamber for directing its rays through the opening.

2. A telephone instrument in accordance with claim 1, said top wall having an upwardly projecting wall concentric with the opening and closely encircling the periphery of said one mouth- and earpiece to confine the rays from the lamp and prevent their escape to the surrounding atmosphere.

3. In a telephone instrument having a base for supporting the handset of the instrument, a sterilization means for the handset comprising a substantially arcuate wall member having generally straight vertical side edges for engaging the side wall of the base and top and bottom wall members extending radially inward from the top and bottom edges, respectively, of the wall member to form a chamber for a sterilizing lamp when the attachment is mounted against the side wall of the base, with the top wall of the arcuate member lying in closely spaced parallel relation to the surface of the mouthpiece of the handset when the latter is supported on the base, the top wall having an opening therethrough for exposing the mouthpiece to said lamp within the chamber and means on the attachment for detachably mounting it to the base.

4. In a telephone having a base supporting the electrical components thereof, a housing for said components mounted on the base and supporting the handset of the telephone, said housing having a side wall formed with a recessed portion for housing a sterilizing lamp therewithin, a detachable cover member for the lamp comprising a first wall having forwardly extending sides spanning the width of the recessed portion, a top and bottom wall connecting the first wall and sides and spaced to span the height of the recess, the top wall lying in close parallel relation to the mouthpiece of the handset when supported on the housing, said top wall having an opening therethrough for exposing the mouthpiece to the direct rays from the lamp and means for detachably mounting the cover member on the side wall of the instrument.

5. In a telephone according to claim 4 including an upwardly extending flange on the top wall concentric with the opening and closely encircling the periphery of the mouthpiece when the latter is supported on the housing.

6. In a telephone having a base supporting the electrical components thereof, a housing for said components mounted on the base and supporting the handset of the telephone, said housing having a side wall formed with a recessed portion for housing a sterilizing lamp therewithin, a detachable cover member for the lamp comprising a first wall having forwardly extending sides spanning the width of the recessed portion, a top and bottom wall connecting the first wall and sides and spaced to span the height of the recess, the top wall lying in close parallel relation to the mouthpiece of the handset when supported on the housing, said top wall having an opening therethrough for exposing the mouthpiece to the direct rays from the lamp and means for detachably mounting the cover member on the side wall of the instrument comprising a forwardly and upwardly extending tongue projecting from the forward edge of the top wall member and a slot formed in the side wall for receiving the tongue.

7. A telephone instrument having a base for supporting the handset of the instrument, a mouthpiece and an earpiece carried by the handset, said base having a laterally extending side wall portion directly beneath at least one of the said pieces, the top wall of the extending side wall portion being in substantially close parallel relation to the said one of the said pieces when supported on the base, a hollow chamber in said laterally extending wall portion having an opening through the top wall in registration with said one of the said pieces and being entirely covered thereby, a circuit for energizing said lamp including a thermal delay relay having normally closed contacts in series with the lamp, a normally open switch for connecting the circuit to a source of voltage and means on the base operated by the handset when supported on the base for closing the switch, said thermal relay operating to open the contacts after a predetermined delay period.

8. A sterilizing device for a telephone including a housing for the telephone equipment and forming a supporting base for the handset of the telephone when not in use, comprising, a sterilizing lamp mounted on the outer surface of the housing beneath the mouthpiece when supported on the base, a cover member surrounding said lamp and detachably connected to the said surface, an opening in said cover member beneath the mouthpiece, when supported on the base, for exposing the mouthpiece to the rays of the lamp, an upwardly projecting wall on the cover member concentric with the opening and in close peripheral relation with said mouthpiece, a circuit rendered operative by said handset when supported on the base for energizing said lamp and means in said circuit for deenergizing said lamp after a predetermined interval of time.

9. A sterilizing device for a telephone in accordance with claim 8 in which the means for deenergizing said lamp comprises a pair of normally closed contact members in series with the lamp, one of said contact members being thermally sensitive, a heating element in heat exchange relation with the thermally sensitive contact element and heated by closure of the switch to move the thermally sensitive contact element to open position when heated to a predetermined temperature by said heating element.

10. A telephone comprising a base for supporting the handset of a subscriber's set, a mouthpiece and an earpiece carried by the handset, a casing on the base for supporting the handset of the telephone, a sterilizing lamp receiving housing mounted on the side of the casing and having a top wall with an upwardly facing opening for receiving and closely encircling one of the said pieces of the handset, a sterilizing lamp mounted in said housing, a circuit for energizing the lamp including a pair of electric terminals on the base for connection to a source of power, and a switch mounted on the base and controlled by the handset for connecting the source of power to the sterilizing lamp when the handset is positioned on the casing.

11. A telephone in accordance with claim 10, further including a delayed action relay in said circuit for deenergizing the lamp after a predetermined period of time following initiation of energization of the lamp.

12. A telephone in accordance with claim 10 including a movable control button biased to project through the casing, and means operated by the button upon placing the handset on the casing over the button for operating the switch.

References Cited in the file of this patent

UNITED STATES PATENTS

| | | |
|---|---|---|
| 2,316,540 | Danley | Apr. 13, 1943 |
| 2,495,034 | Sullivan | Jan. 17, 1950 |
| 2,697,173 | Balakofsky | Dec. 14, 1954 |
| 2,763,735 | Waal | Sept. 18, 1956 |

OTHER REFERENCES

The "Danco" brochure (both sides), May 6, 1959.